United States Patent [19]
Wiegand et al.

[11] Patent Number: 5,285,185
[45] Date of Patent: Feb. 8, 1994

[54] DUAL-CODED DATA COMPARATOR

[75] Inventors: Hermann-Josef Wiegand, Baiersdorf; Klaus Haken, Erlangen, both of Fed. Rep. of Germany

[73] Assignee: Siemens Aktiengesellschaft, Munich, Fed. Rep. of Germany

[21] Appl. No.: 784,547

[22] Filed: Oct. 29, 1991

[30] Foreign Application Priority Data

Oct. 30, 1990 [EP] European Pat. Off. ........ 90120804.1

[51] Int. Cl.$^5$ .................... G06F 7/02; G06F 1/035
[52] U.S. Cl. .................................. 340/146.2
[58] Field of Search ...................... 340/146.2

[56] References Cited

U.S. PATENT DOCUMENTS

| | | | |
|---|---|---|---|
| 4,100,532 | 7/1978 | Farnbach | 340/146.3 |
| 4,675,646 | 6/1987 | Lauer | 340/146.2 |
| 4,855,946 | 8/1989 | Ruben et al. | 364/721 |

FOREIGN PATENT DOCUMENTS 2110856 6/1983 United Kingdom .

OTHER PUBLICATIONS

IBM Technical Disclosure Bulletin, vol. 12, No. 2, Jul. 1969, New York, US, p. 247.

*Primary Examiner*—Long T. Nguyen
*Attorney, Agent, or Firm*—Kenyon & Kenyon

[57] ABSTRACT

A fast, flexible hardware comparator is implemented using read-write memory chips (RAMs). Characteristic data is stored at a specific address corresponding to the reference value, which can be read out only in case of agreement when addressed by the actual value. To reduce the addresses to be decoded in the RAMs, the required address lines are evenly distributed among several RAMs. The present invention can be used as an address comparator in software testing, and as a reference/actual value comparator in digital control circuits, if the address difference from the reference value address in each case is additionally stored in the RAMs.

18 Claims, 9 Drawing Sheets

| e6 | e5 | e4 | e3 | e2 | e1 | a1 | a2 | a3 |
|----|----|----|----|----|----|----|----|----|
| 0  | 1  | –  | –  | –  | –  | 1  | 0  | 0  |
| 1  | 1  | 0  | 1  | –  | –  | 1  | 0  | 0  |
| 1  | 1  | 1  | 1  | 0  | 1  | 1  | 0  | 0  |
| 1  | 1  | 1  | 1  | 1  | 1  | 0  | 1  | 0  |
| –  | 0  | –  | –  | –  | –  | 0  | 0  | 1  |
| 1  | –  | 0  | –  | –  | –  | 0  | 0  | 1  |
| 1  | 1  | 1  | 1  | –  | 0  | 0  | 0  | 1  |

DUAL-CODED DATA COMPARATOR

BACKGROUND OF THE INVENTION

The present invention relates generally to comparators, and more particularly to a comparator for comparing dual-coded data, such as can be used for fast address comparison in computer systems, for testing and diagnosis of software, or in digital control circuits for comparison of reference and actual values.

In some hardware comparators, the data is checked directly, bit by bit, using gates or comparators. However, with the bit width of data words used in current computer systems, this leads to a correspondingly large number of components. In many instances, these large numbers of components cannot be tolerated, because of the resulting space requirement.

U.S. Pat. No. 4,100,532 discloses a comparator provided with memory in which characteristic data are stored at specific addresses, which map the comparison data in question so that the data can be output by address control. By dividing the address lines into individual groups, the known device achieves a reduction in the required address space, and a 2-bit wide version of the memory makes it possible to provide information as to whether a currently accessed address is equal to or greater than the comparison address.

The present invention is directed to the problem of further developing hardware comparators for comparing dual-coded data by reducing the number of required components and by expanding their area of application.

SUMMARY OF THE INVENTION

The present invention solves this problem by distributing the address lines evenly in groups among several 1-bit wide memory chips, in which characteristic data are stored relative to a specific address mapping the comparison data item. This characteristic data can be output with address control by a second data item to be compared with the comparison data item, in that the data output of each memory is connected with the read command input of the memory which is assigned to the address line group with the next higher value.

DETAILED DESCRIPTION

Figure 1:
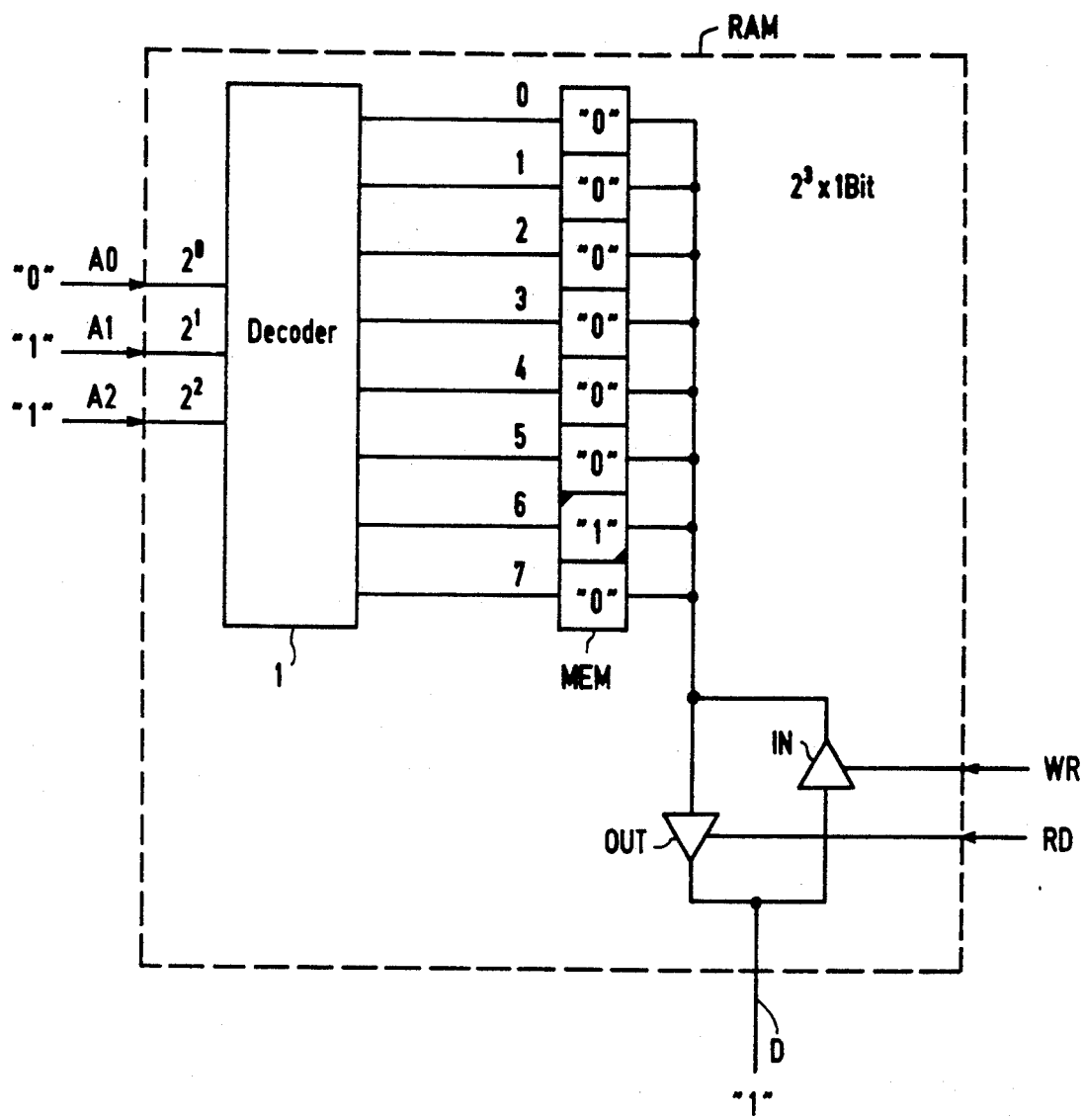
FIG. 1 illustrates the basic structure of a RAM.

FIG. 1 shows the basic structure of a 1-bit wide memory using the example of a read-write memory also designated as Random Access Memory (RAM). The memory has three address inputs, to which address lines A0, A1 and A2 are connected. These address inputs act on the inputs of an internal decoder, which decodes the $2^3$ possible signal combinations of the address lines A0 to A2 into eight addresses 0 to 7, by outputting an access signal for one of the memory cells designated as MEM at only one of its eight output lines for each individual signal combination. The content of the memory cell selected by its address access can either be output by means of a read command RD, via a data gate OUT, to the output line D, or, by activating the data gate IN, the signal on the data line D can be taken over into this memory cell by means of a write command WR, i.e. it can be written to. If, as shown, the address lines A2 and A1 have the value logic "1" and the address line A0 has the signal status logic "0" and if the value logic "1" is applied to the data line D, then this value is written into the memory cell with the address 6, using the write command WR. On the other hand, if the memory is charged in this way, and if the data gate OUT is activated using the read command RD, the signal logic "1" is only issued if the address lines have the signal combination shown, namely dual 6, applied to them, and every other signal combination of the address lines A0 to A2 will result in the value logic "0" when the memory is read out. In this way, it can be determined whether any desired dual-coded data item which is applied to the address lines of the RAM agrees with the comparison data item, i.e. if data which is characteristic for the equivalence of the two data, in this example logic "1", is stored at an address determined by the comparison data item. The comparison of two data is reduced, so to speak, to a comparison of location in the RAM.

Figure 2:
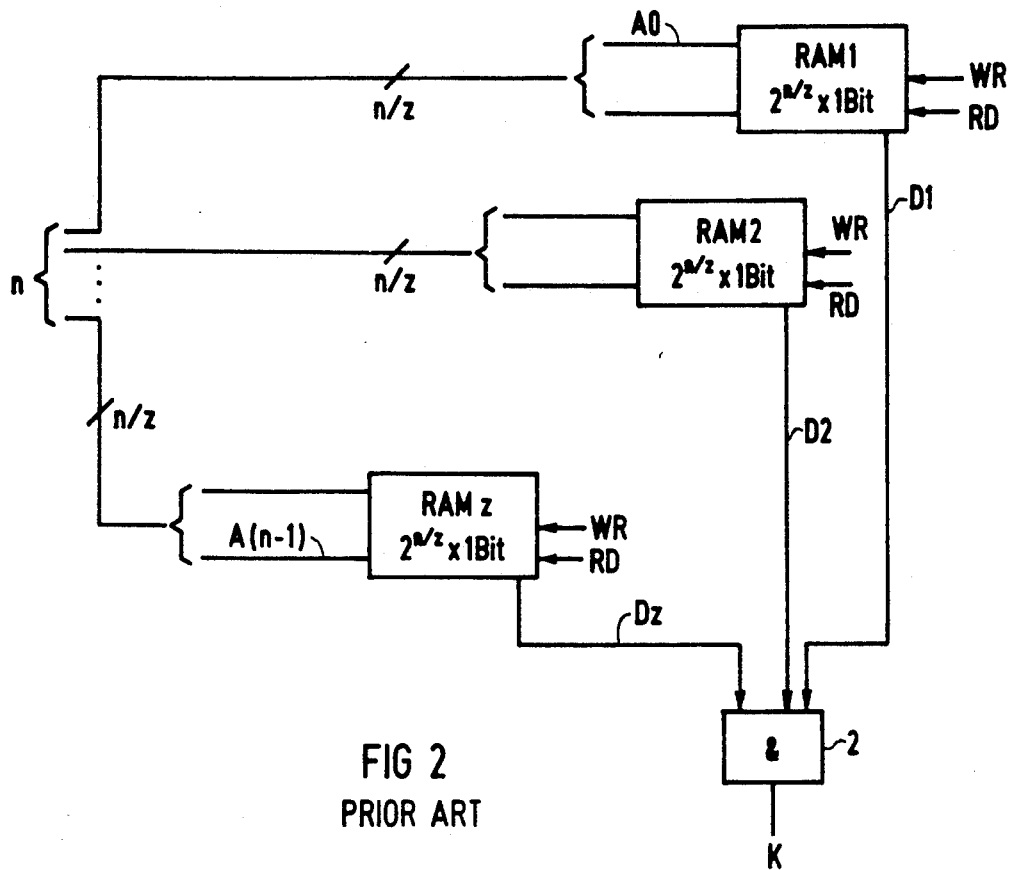
FIG. 2 depicts a known address comparator with group-type division of the address lines.

FIG. 2 shows a known address comparator, in which the number of addresses to be decoded is reduced. This comparator has z 1-bit wide RAMs RAM1 to RAMz. The n-address lines required for formation of the memory addresses are divided in groups among the individual RAMs, so that z groups of different value, with n/z address lines each, are passed to the RAMs. Thus, the n-digit data to be compared is divided into z partial data, each of which is n/z-digit and is decoded in its own RAM, the data output of which is only logic "1", i.e. "true" at the partial address assigned to the partial comparison data. The data outputs of all the RAMs are connected with the inputs of an AND gate 2, the output signal K of which has the value logic "1", if the value logic "1" occurs as the criterion of agreement of the comparison data item with the data item to be compared, in groups at the assigned data output D1 to Dz in each case. The memory volume to be built up is reduced to $z \cdot 2^{n/z}$ with this arrangement. Therefore, the greater z is selected to be, the smaller the required memory volume becomes, but the number of required memory modules increases since this number is proportional to z. As a rule, a compromise will have to be reached between the smallest possible expansion of the individual memory chips and minimization of the number of memory modules.

Figure 3:
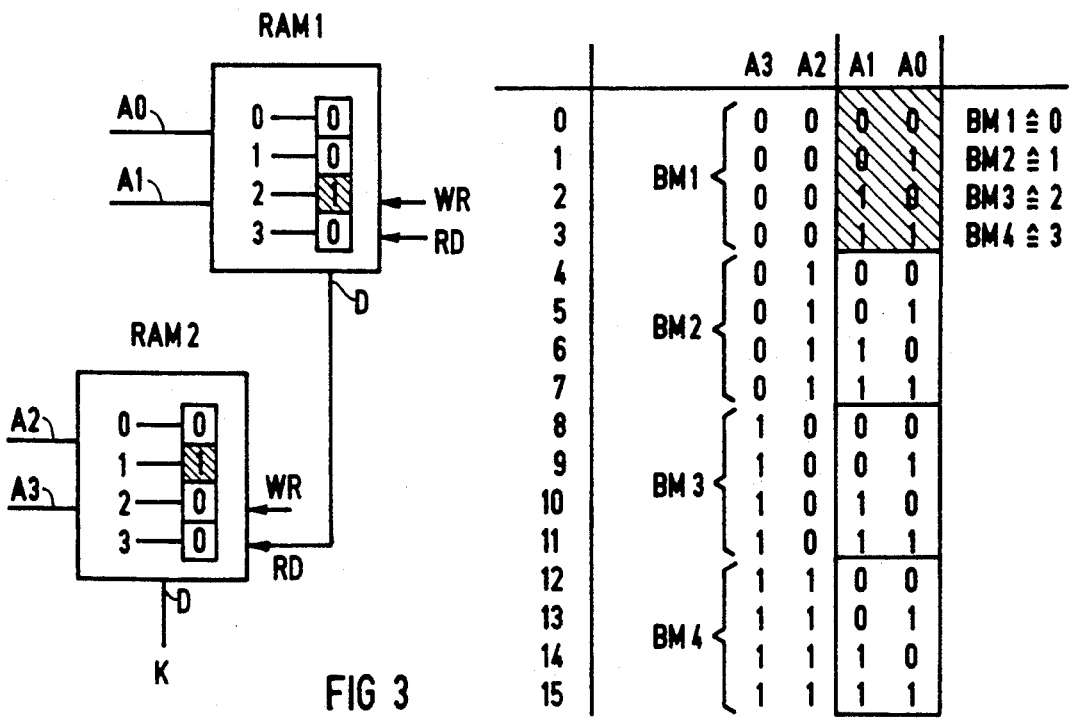
FIG. 3 shows an example for group-type evaluation of partial data according to the present invention.

FIG. 3 serves to illustrate the group-type evaluation of the partial data of an address comparator according to the present invention, showing an easily understandable example. In the right part of FIG. 3, the value range of 0 to 15 which can be represented with four address lines A0 to A3 is shown with the related combinations of signal status of these address lines. If the address lines A0 to A1 are combined into a group with lower value, with the weight $4^0=1$, and the address lines A2 to A3 are combined into a group with higher value, with the weight $4^1=4$, and if the address value is allowed to run from 0 to 15, then four bit patterns BM1 to BM4 result for the lower-value address line group A0, A1, which repeat cyclically three times. The same bit patterns occur in the same cyclical sequence also for the higher-value address line group A2 and A3, but for a complete cycle of these bit patterns in the lower-value address line group, the bit pattern of the higher-value address line group remains the same. Analogous to a mechanical gear translation of 4:1, where for every four revolutions of the one gear wheel, one revolution of the other one occurs, the bit pattern sequence BM1 to BM4 occurs for the lower-value address line group A0, A1 per bit pattern of the higher-value address group A2, A3. Therefore it is possible, by taking into consideration the weight of the groups, to decode 16 addresses with two RAMs, each of which only has to decode four addresses. In the left part of FIG. 3, two RAMs RAM1 and RAM2 are assigned to the address line groups A0, A1 and A2, A3. As in FIG. 1, the value 6 is assumed as the comparison data item, so that the value 1 is stored at the corresponding partial address, as indicated with shading. This partial address is 2 in RAM 1 and 1 in RAM2. In equivalent modification of FIG. 2, the AND link of the two data outputs is brought about in that the data output of the RAM assigned to the lower-value address line group is connected with the read control input RD of the RAM assigned to the higher-value address line group and supplies the read command in this way. Therefore the need for an AND gate is eliminated. If the value of the data item to be compared, which is on the address lines A0 to A3, now starts to increase from 0 to 15, then the data output at RAM1 for the lower-value address line group will assume the logic value "1" at the values 2, 6, 10 and 14 (A0=0, A1=1). The value logic "1" can be read out of RAM2 only if A2=1 and A3=0 is also true, which is the case when the value of the data item to be compared is 6.

The principle shown in FIG. 2 and explained using FIG. 3 can be implemented for any bit width, i.e. for any number of positions n of the dual-coded information and for any number of groups z, and is essentially based on dividing an n-digit dual number into z groups with n/z digits in each case, and processing it in a $2^{n/z}$ number system.

Figure 4:
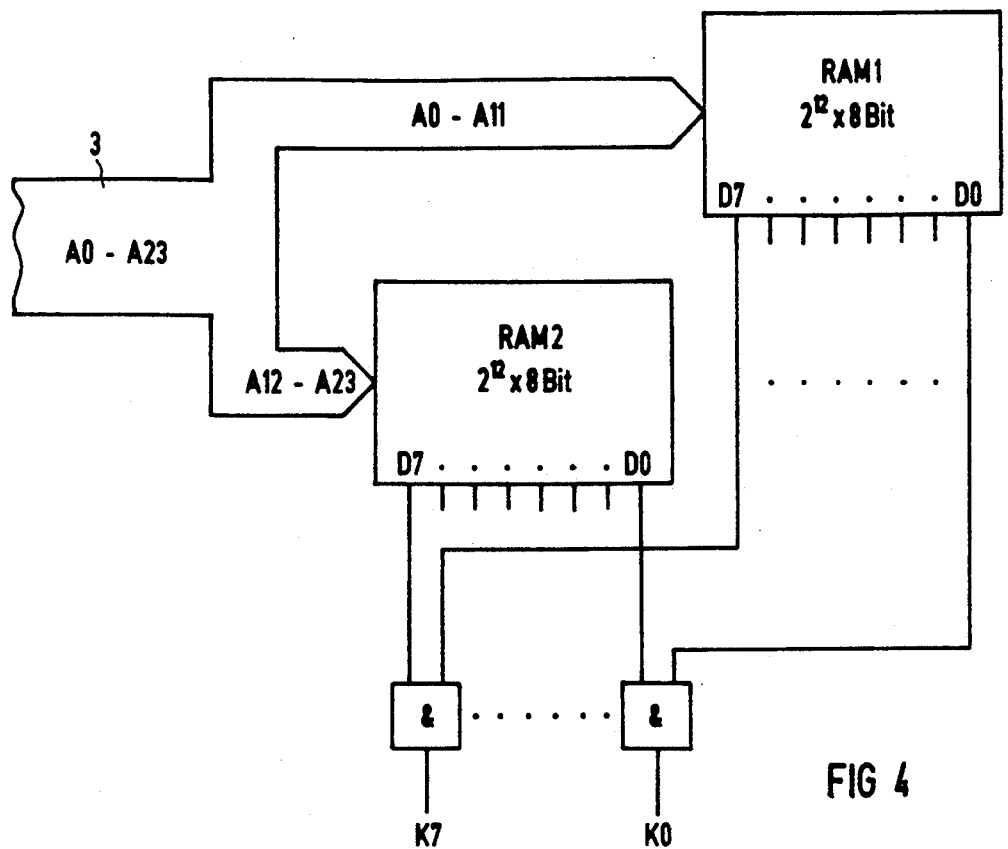
FIG. 4 illustrates a comparator according to the present invention for eight addresses.

FIG. 4 shows an embodiment of the present invention with which an address comparison with regard to eight reference value addresses is supposed to be undertaken for an address bus with 24 address lines A0 to A23. If a single memory is used, it would have to decode $2^{24} \approx 16 \cdot 10^6$ addresses in this example. According to the present invention, the 24 address lines of the address bus 3 are divided in half between RAM1 and RAM2, which are each 8 bits wide. According to the principle explained in FIG. 3, the characteristic information for a specific partial address, namely logic "1", is stored in the columns belonging to the data outputs D0 to D7 of each of the two RAMs. The data output lines D0 to D7 belonging to a specific address are passed to the inputs of AND gates, and the coincidence signals K0 to K7 then occur at the outputs of these AND gates during inquiry, if the address on the address bus agrees with one of the specific addresses. The arrangement according to FIG. 4 corresponds to the arrangement according to FIG. 2 with n=24 and z=2, as well as a multibit-width version of the memory chips, corresponding to the multiple comparison.

Figure 5:
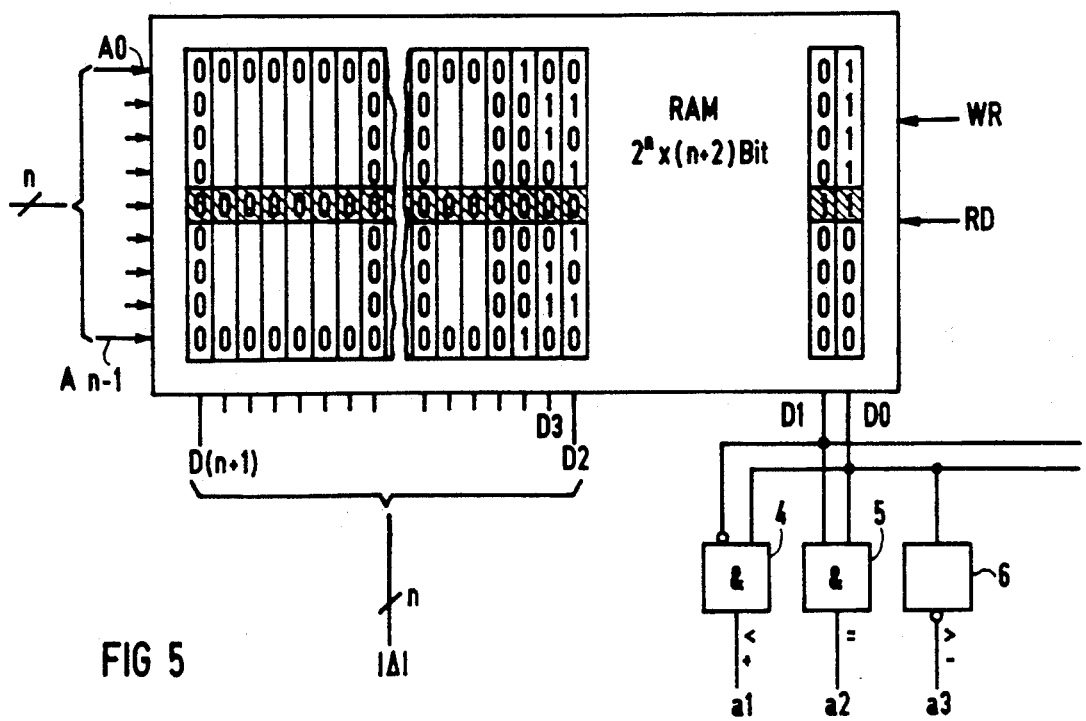
FIG. 5 depicts a basic element of a reference/actual value comparator according to the present invention outputting the amount and the sign of the deviation.

For reference/actual value comparison in digital control circuits, it is necessary not only to determine the agreement between a reference value address marked in the memory with the address applied, which corresponds to the current actual value in each case, but rather, for two-point or three-point controls, a qualitative statement whether the current actual value is greater or less than the reference value, and, for quasi-constant controls, also a quantitative statement as to the size of the reference/actual value difference, i.e. the deviation, is also required. The basic memory structure for this is shown in FIG. 5. The characteristic information entered into a memory line assigned to the reference value address is emphasized with shading. The columns of a RAM, designated as RAM, assigned to the two data outputs D0 and D1, serve for an inquiry of data as to how the actual value is behaving relative to the reference value. At the reference value address, the characteristic information consists of the logic value "11", for addresses which are less than the reference value address, the logic value "01" is entered, and for addresses which are greater than the reference value address, the characteristic information consists of the value "00". The inverted signal of the data output line D1 and the signal of the data output line D0 are passed to an AND gate 4, so that a "1" signal occurs at its output designated as a1, if the actual value address is less than the reference value address, i.e. if the difference between the reference value and the actual value is positive. At the output of the AND gate 5, the inputs of which are connected with the data lines D0 and D1, a "1" signal appears if the actual value address agrees with the reference value address, while a "1" signal occurs at the output of the invertor connected with the signal of the data output line D0 on the input side, if the actual value is greater than the reference value, i.e. if the deviation has a negative sign.

The RAM designed for n address lines A0 to An−1 is furthermore expanded by a column width which corresponds to the number of address lines, and in each line assigned to an address, its relative distance from the reference value address is entered in dual-coded form. Thus, the value of the lines adjacent to the reference value address is 1, that of the next lines is 2, etc. With a write command WR, the RAM can be read out line by line, corresponding to the applied address, with the amount $|\Delta|$ of the deviation then being received at the data outputs D2 to Dn+1, "1" signals being received at the outputs a1 or a3, depending on the sign of the deviation, or a "1" signal being received at the output a2 if the reference value and actual value are in agreement.

Figure 6:
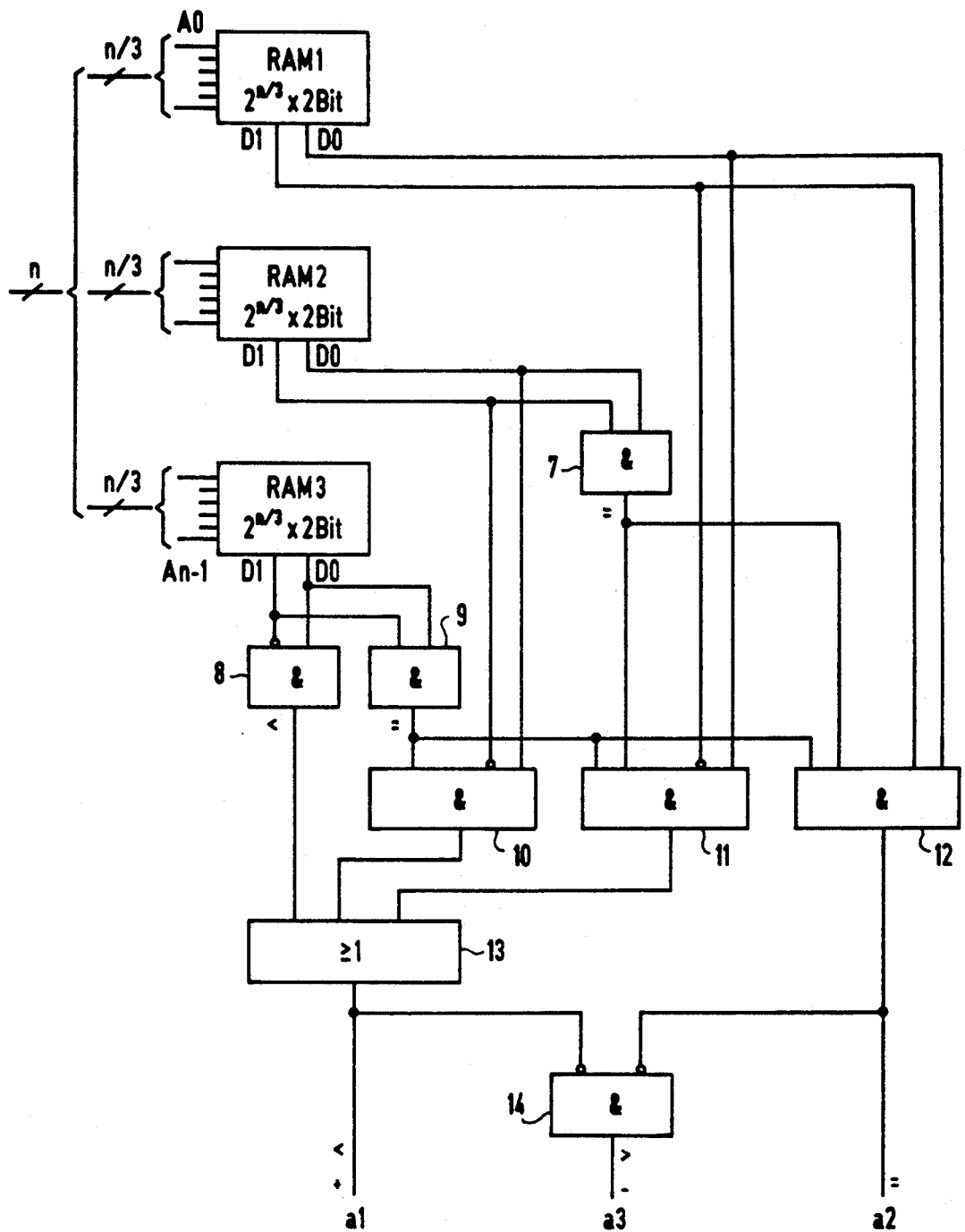
FIG. 6 shows a known embodiment for a reference/actual value comparator which can be used in two-point or three-point controls.

FIG. 6 is an example of the structure having a reduction in the addresses to be decoded by dividing the address lines into three groups for digital two-point or three-point control. RAM1 to RAM3 are two bits wide and the characteristics are stored in their memory cells in the manner shown in FIG. 5. Therefore it is possible to determine, per address line group, whether the partial reference value address assigned to it is greater than, equal to or less than the corresponding partial actual value address. The evaluation of the partial data relating to the individual group takes place by means of a logic circuit consisting of the gates 7 to 14, taking into consideration the weight of the individual groups. As a matter of principle, the group with the highest value determines the sign of the deviation, and if an agreement between the reference value address and the actual value address is found for this group, this function passes on to the group with the next lower value. Therefore, the AND gates 8 and 9, which correspond to the AND gates 4 and 5 in FIG. 5, are used to check whether the actual value is less than the reference value. If this is the case, a "1" signal occurs at the output of the OR gate 13. Since the output of the AND element 9 then has a "0" signal at the same time, the AND gates 10, 11 and 12 are blocked with this "1" signal. If, on the other hand, the actual value address at the highest-value groups assigned to RAM3 is greater than the reference value address there, the output signals of the AND gates 8 and 9 are both logic "0", as is the output signal of the OR gate 13 and the output signal of the AND gate 12, so that the output of the AND gate 14 is a "1" signal. If, on the other hand, there is agreement between the actual value and the reference value at the highest-value group, then only the output signals of gates 8 and 9, will have a "1" signal, with which the AND gates 10, 11 and 12 are made ready to undertake evaluation of the sign, using the data output signals D0 and D1 of the next lower address line group, in precisely the same manner: If D1=0 and D0=1, then the reference value address of the address line group assigned to RAM2 is smaller than the reference value and a "1" signal appears at the output of the AND gate 10 and therefore also that of the OR gate 13, while the "0" signal which occurs at the output of the AND gate 7 at the same time blocks the AND gates 11 and 12. If agreement between the reference value and actual value is achieved also at the address line group assigned to RAM2, a "1" signal appears at the output of the AND gate 7, which causes the determination of the sign of the deviation to pass on to the group with the lowest value, until finally a "1" signal appears at the output of the AND gate 12, if agreement between the reference value address and the actual value address prevails in all three RAMs, i.e. the deviation has become zero.

Figures 7, 8:
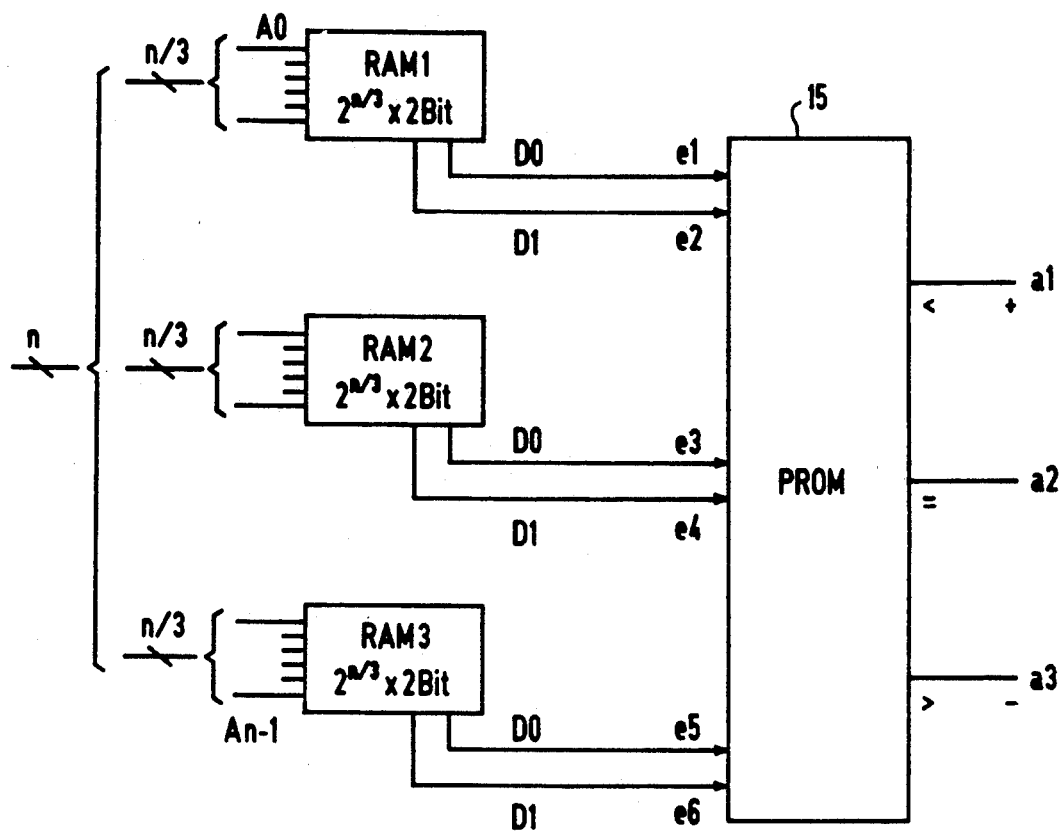
FIGS. 7 and 8 depict the corresponding, improved embodiment according to the present invention.

FIG. 7 shows an advantageous embodiment of the reference/actual value comparator shown in FIG. 6 according to the present invention. The logic circuit, which consists of individual gates 7 to 14 there, is implemented using a read-only memory 15 in the form of a PROM (Programmable Read Only Memory). The data outputs D0 and D1 of the individual RAMs, RAM1 to RAM3, are connected with the inputs e1 to e6 of the PROM 15, and the connection between the signal status of these inputs and the signal status of the outputs a1, a2 and a3 of the PROM 15 is shown by the related truth table in FIG. 8. In the left half of the truth table, the signal status of the input lines e1 to e6 is entered, line by line, in the usual manner, with that signal status being supposed to result in the signal status of the outputs a1 to a3, with horizontal lines in the fields of the left half of the table pointing out that the signal status of the assigned input line is meaningless (sometimes referred to as a "don't care"). For example, independent of the signal status of the input signals e1 to e4, all that is required is a signal status of e6=0 and e5=1, in order to cause a "1" signal at the output, which characterizes a positive deviation ($\Delta$), i.e. an actual value which is less than the reference value. This condition, and also the conditions formulated in the other lines of this truth table, are in harmony with the evaluation according to FIG. 6.

Figure 9:
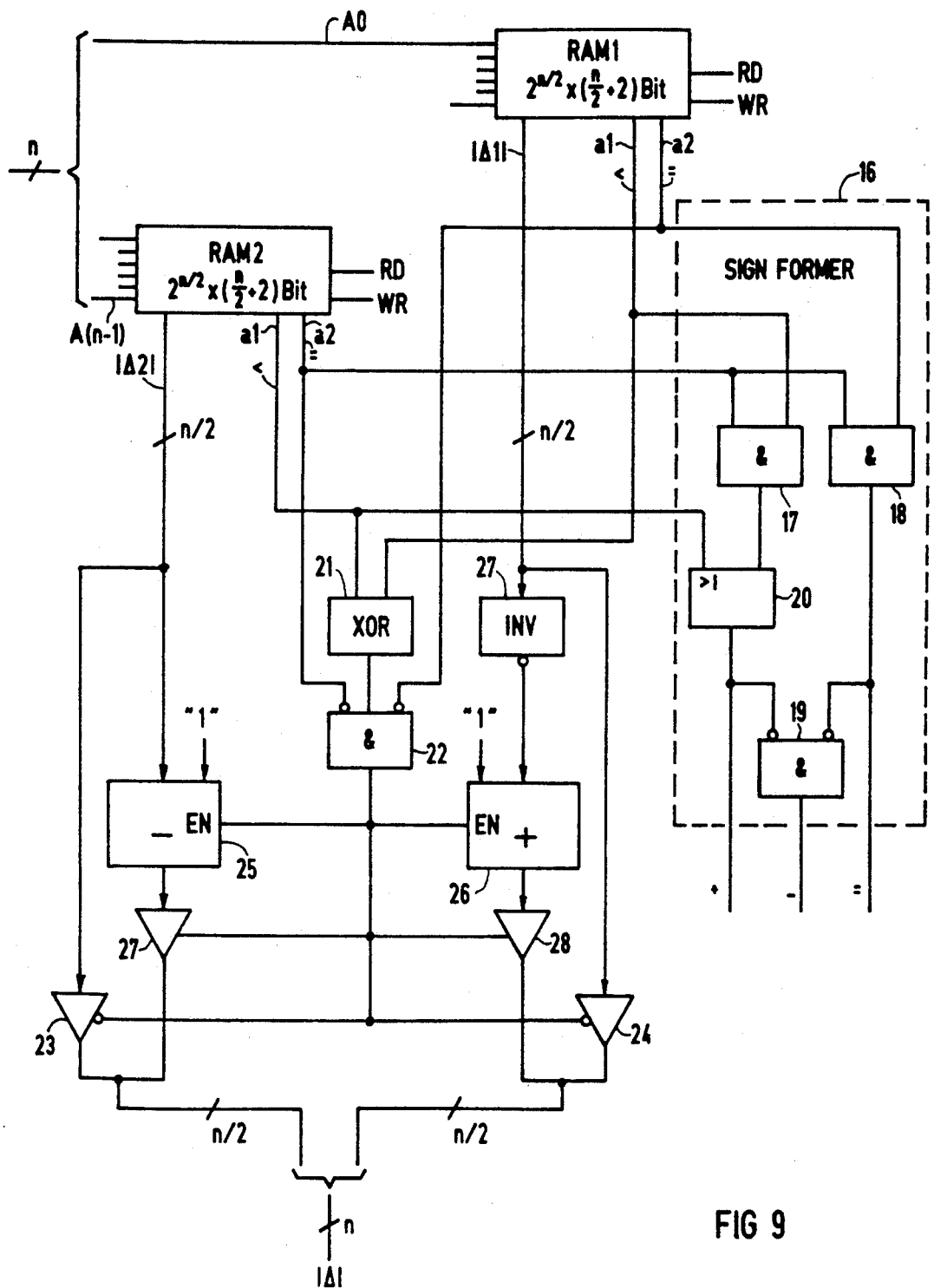
FIGS. 9 and 10 illustrate two embodiments of reference/actual value comparators according to the present invention outputting amount and sign of the deviation, as well as group-type division of the address lines.

FIG. 9 shows an embodiment of a reference/actual value comparator, with which not only the sign of the deviation, but also its amount can be output. The address lines A0 to An−1 are divided in half between two RAMs, RAM1 and RAM2, where the structure of each of the two RAMs agrees with that described in FIG. 5. Each of the two RAMs therefore contains two columns, the data outputs of which are evaluated by two AND gates, and "1" signals at the outputs a1 or a2 of this AND gate, not shown in FIG. 9, give information as to whether an actual value address assigned to their address line group is less than or equal to the reference value address. The output lines a1 and a2 of the two RAMS, RAM1 and RAM2, are connected with a sign former 16 consisting of three AND gates 17, 18 and 19, or one OR gate 20, which also functions according to the method described in connection with FIG. 6, according to which the address line group with the higher value determines the sign, as long as no agreement between the reference value address and the actual value address (a2=1) has occurred yet. This function therefore is passed on to the other address line group.

It is now dependent on the relative position of the actual value partial addresses relative to the reference value partial addresses in the two RAMs, RAM1 and RAM2, in each case, how the weighted amounts of the partial deviations $|\Delta 1|$ and $|\Delta 2|$, stored in RAM1 and RAM2, which can be output by the read command RD, are processed to yield the total deviation $|\Delta|$: If the two partial deviations $|\Delta 1|$ and $|\Delta 2|$ have the same sign, or if the partial actual value and the related partial reference value agree in at least one RAM (a2=1), then the partial deviations $|\Delta 1|$ and $|\Delta 2|$ are joined together, unchanged, to yield the total deviation $|\Delta|$, i.e. added together with correct digit position, otherwise the partial deviation $|\Delta 1|$ with the lower value is subtracted, with correct digit position, from the partial deviation with the higher value. This is controlled by an exclusive OR (XOR) gate 21, in which the "smaller" outputs a1 of the two RAMs are passed in on the input side, as well as by an AND gate 22 which follows it, the two additional inputs of which have the inverted signals of the outputs a2 of the RAMs applied to them. If the signals at the output of the two RAMs designated with a1 have the same level, i.e. if both are logic "1" or logic "0", then the output of the XOR gate 21 and therefore also the output of the AND gate 22 demonstrates a "0" signal, which causes the partial deviations $|\Delta 1|$ and $|\Delta 2|$ to be switched through, unchanged, via data gates 23 and 24, and to appear added with correct digit position at the output, as a total deviation $|\Delta|$. Such switching through via the data gates 23 and 24 also takes place if at least one of the outputs a2 of the RAM demonstrates a "1" signal. If the signals at the outputs a1 of the two RAMs are different, and if both the output a1 and the output a2 demonstrate a "0" signal at one of the RAMs, then a "1" signal will appear at the output of the AND gate 22, with which a subtractor 25 is enabled, in order to reduce the amount of the deviation $|\Delta 2|$ by the value 1. At the same time, an adder 27 is also enabled with the "1" signal and the AND gate 22, in order to increase the deviation $|\Delta 1|$, which has been inverted by means of an invertor 27, i.e. complemented in bits to the valued 1, by the value 1. The output of the adder 26 therefore makes the twos complement of the deviation $|\Delta_1|$ available. The "1" signal of the AND gate 22 furthermore activates the data gates 27 and 28, causing the outputs of the subtractor 25 and the adder 26 to be switched through to the output, and in this way, the difference $|\Delta_2|-|\Delta_1|$ to be formed with correct digit position. Since only the input value is to be changed only by the value 1 in the calculation mechanisms 25 and 26, in each case, they can be structured in correspondingly simple manner, in that they contain only one known half-adder or half-subtractor stage per bit position, with this stage in turn consisting of only two gates.

Figure 10:
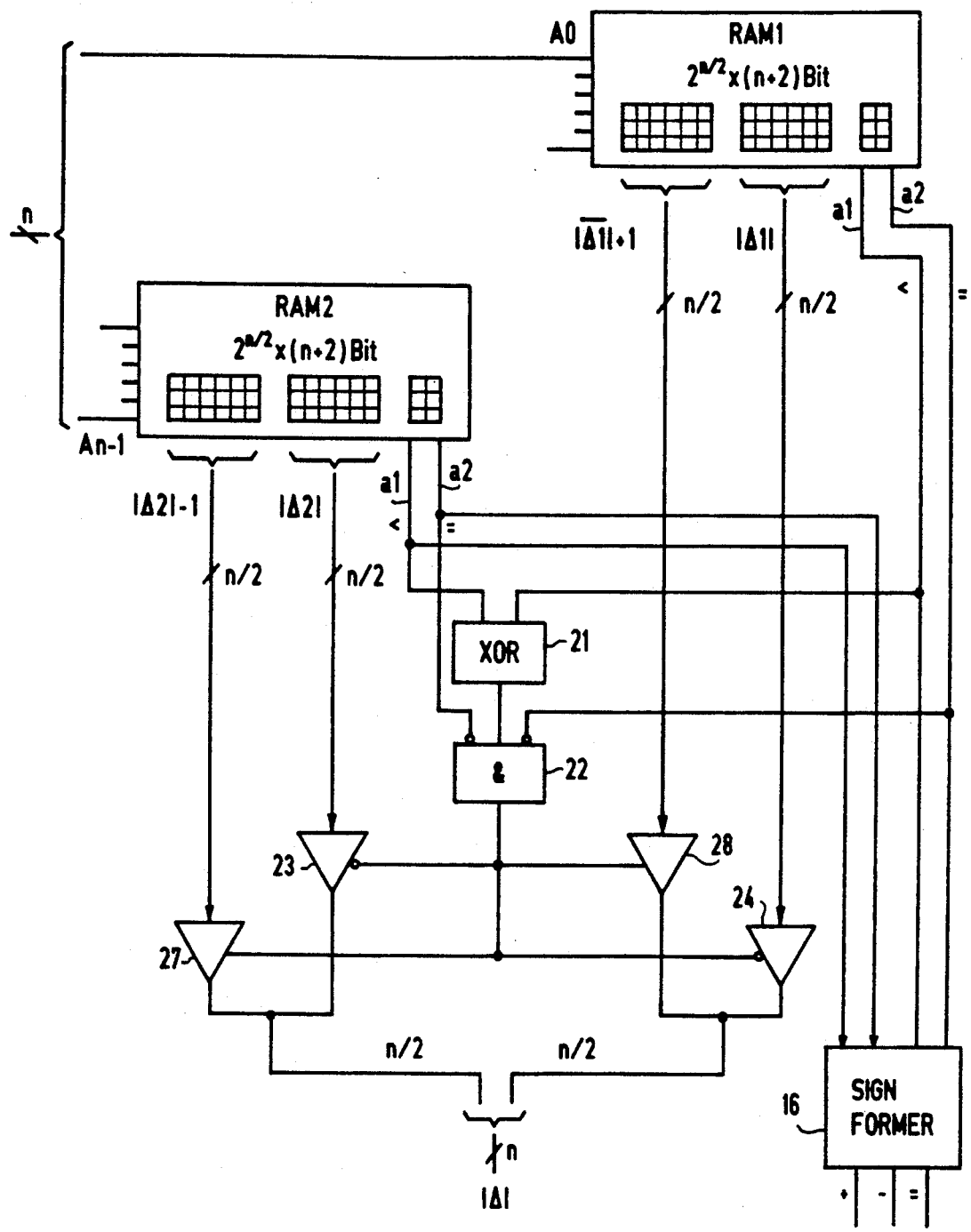

FIG. 10 shows a variation which makes do without the adder 25 and subtractor 26 as well as without the invertor 27, in that the results to be processed by these components, on a case by case basis, are kept available in the RAMs, RAM1 and RAM2, for every possible actual value. For this purpose, the bit width of these RAMs is expanded by n/2 bits at n address lines A0 to An−1, as compared with the memory structure shown in FIG. 9, and the address difference from the predetermined partial reference value address at the RAM assigned to the address line group with the higher value, RAM2, is entered reduced by the value 1 ($|\Delta_2|-1$), and the inverted value of the address difference from the partial reference value address, increased by 1 ($|\Delta_1|+1$)—as a twos complement—, is entered at the RAM assigned to the address line group with the lower value, RAM1. In this way, the partial results of a sign-correct weighted addition are immediately available for every actual value address, i.e. for every possible actual value, avoiding time-consuming arithmetical operations, and these are switched through in exactly the same manner as described in FIG. 9, by means of the XOR gate 21 and the AND gate 22 which follows it, via the data gates 23, 24 or 27, 28, i.e. brought together to yield the amount of the total deviation $|\Delta|$, while the sign of this deviation is determined by the sign former 16, as with the arrangement according to FIG. 9.

Figure 11:
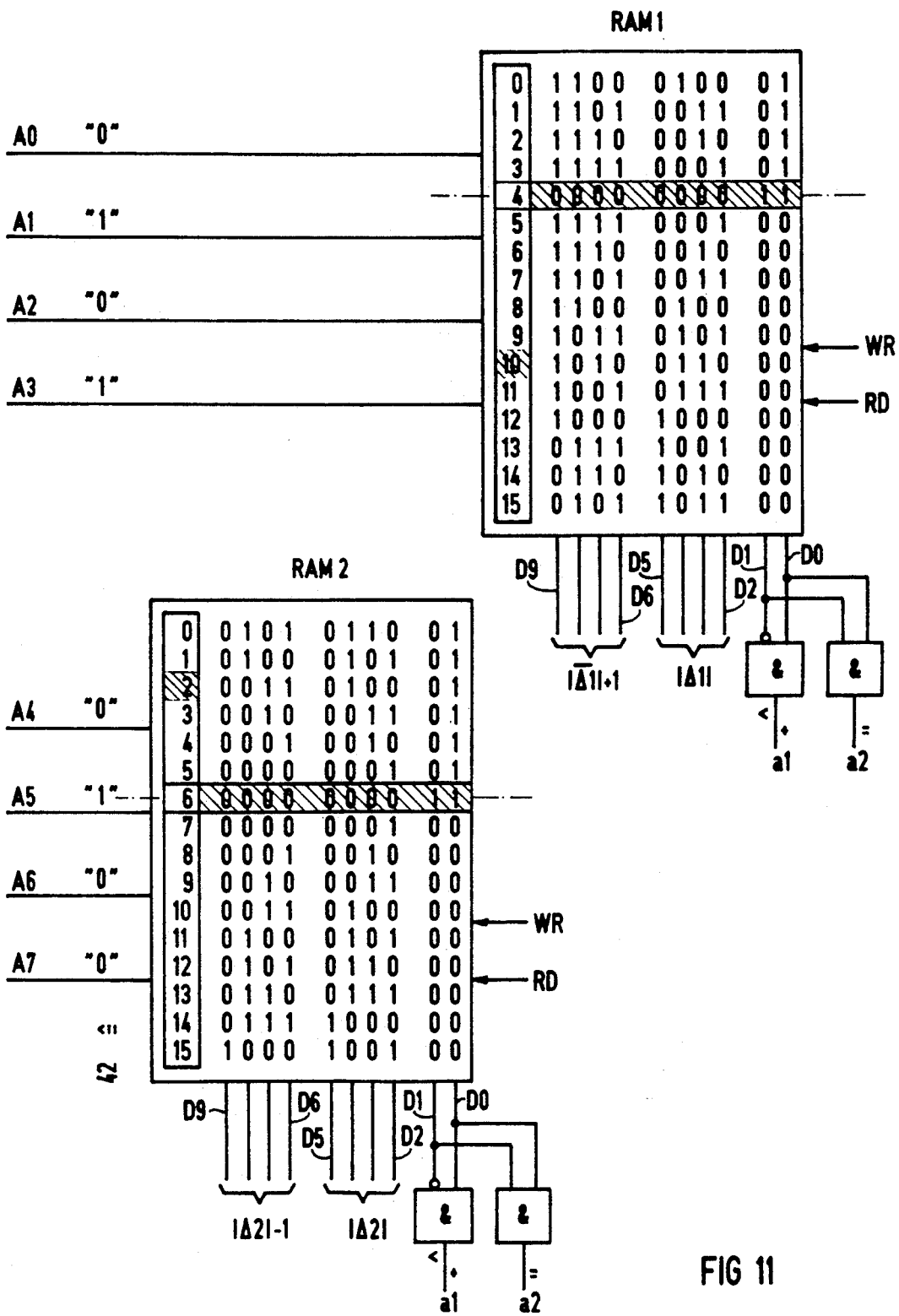
FIG. 11 shows a numerical example for formation of the deviation.

FIG. 11 represents a concrete numerical example for the arrangement according to FIG. 10. A reference/actual value comparator with eight address lines A0 to A7, yielding an actual value range of 0 to 255, is used as the basis. The address lines A0 to A3 form the lower-value group and are passed to RAM1, while the address lines A4 to A7 form the higher-value address line group and are applied to RAM2. The addresses decoded in RAM1 are therefore weighted with $16^0=1$, while those decoded in RAM2 are weighted with $16^1=16$. The memory lines assigned to the reference value address are emphasized with shading, which makes it evident that the predetermined reference value address is $6\times16+4\times1=100$. As the actual value, the decimal value 42 is supposed to be on the address lines A0 to A3 in dual coding, which corresponds to the signal status indicated on these address lines. With this, the addresses also emphasized with shading are accessed in the RAMs, specifically the address 10 in the RAM assigned to the lower-value address line group, RAM1, and the address 2 in the RAM assigned to the higher-value address line group, RAM2. The output signals of RAM1 assigned to the sign data are a1=0 and a2=0, while the corresponding output signals of RAM2 are a1=1 and a2=0. Corresponding to the method of effect described in connection with FIG. 10, of the gates 21 and 22, not shown in FIG. 11, the data lines D6 to D9 are therefore switched through at both RAMs, by corresponding activation of the data gates 27 and 24 assigned to the two RAMs. The amount of the total deviation $|\Delta|$ therefore comes to 00111010=58 on the output side, which corresponds to the amount of the difference between a reference value of 100 and an actual value of 42, while as the sign of the deviation, a "1" signal will occur in the sign former 16, not shown in FIG. 11, only at its output designated with +.

Figure 12:
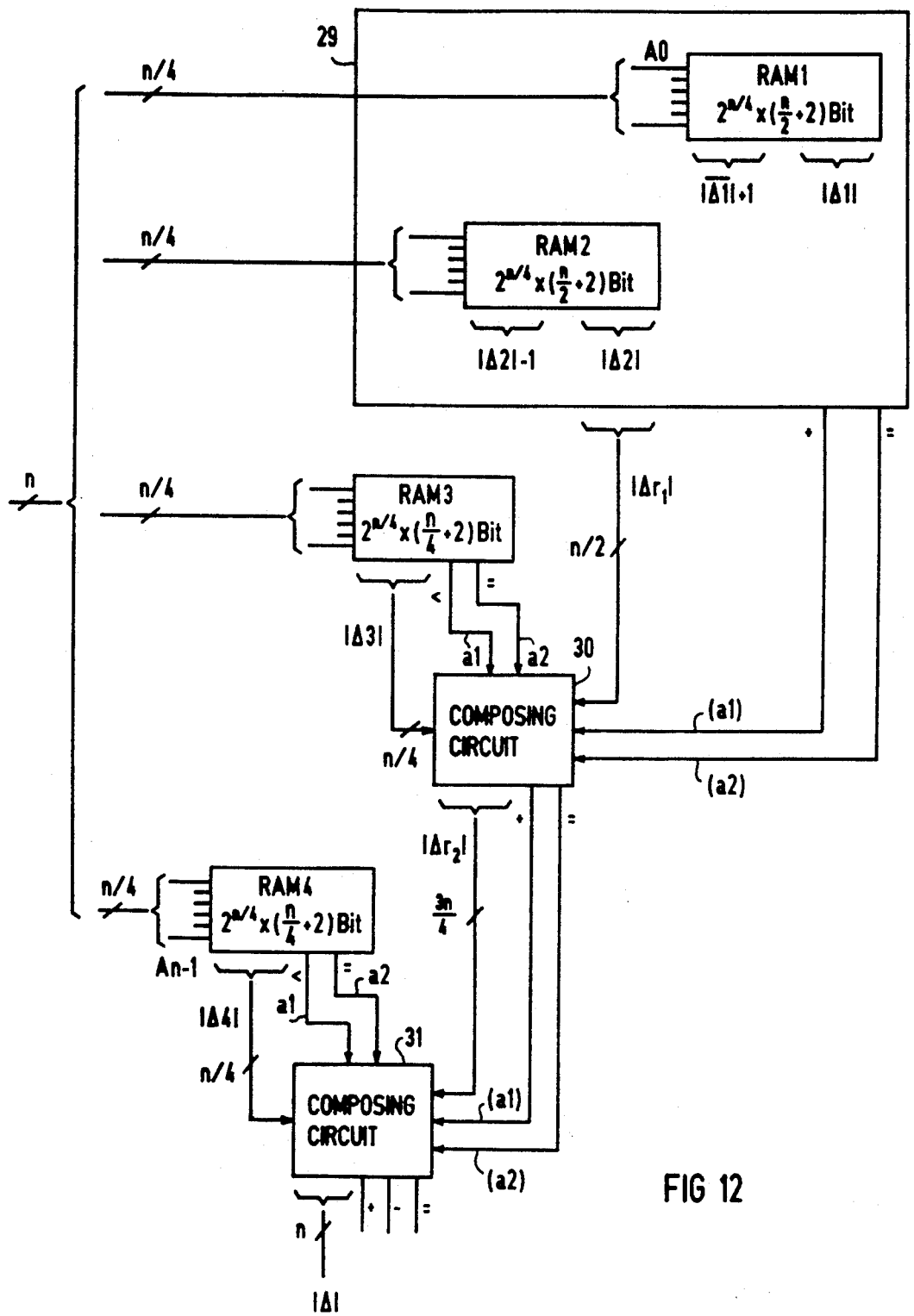
FIG. 12 depicts an implementation of a reference/actual value comparator according to the present invention with more than two address line groups.

The block diagram of FIG. 12 shows in schematic form how a reference/actual value comparator for more than two address line groups, according to the present invention, can be implemented for four address line groups in the example shown. The n address lines A0 to An−1 necessary for representation of the actual value data are distributed evenly among four RAMs, RAM1 to RAM4. The function block designated with 29 contains the arrangement shown in FIG. 10, with the exception of the missing AND gate 19, and thus causes weighted addition of the partial deviations, with the correct sign, which is assigned to the two address line groups with the lowest value. The n/2-bit wide partial deviation $|\Delta r_1|$ output from the function block 29, as well as the signals of its output lines designated with "+" and "=", are applied to a composing circuit designated as 30, to which the partial deviation $|\Delta_3|$ stored in RAM3, and the signals of the outputs designated with a1 and a2 are also passed, analogous to the arrangement according to FIG. 9. The composing circuit 30 contains the arrangement according to FIG. 9, with the exception of the RAMs and the AND gate 19, with the bit width of the invertor 27 forming the one's complement, of the adder 26 as well as of the data gates 24 and 28 being twice as great as the bit width of the subtractor 25 and of the data gates 23 and 27. If one takes into consideration that the output line of the function block 29 designated with "+" is equivalent to the output line of RAM1 in FIG. 9, designated with a1, in that it also has a "1" signal in case of positive deviation (actual value less than reference value), and the output line of the function block 29 designated with "=" corresponds to the output line of RAM1 designated with a2 in FIG. 9, then it becomes clear, referring to FIG. 9 and its description, that a 3.n/4-bit wide partial deviation $|\Delta r_2|$ will be obtained at the output of the composing circuit 30, which was formed with the correct sign from the partial data of the three address line groups with the lowest value. In analogous manner, in the subsequent stage, which contains the composing circuit designated with 31, and the fourth RAM, RAM4, the partial deviation $|\Delta_4|$ formed by the address line group with the highest value is added to the partial deviation $|\Delta r_2|$ output of the composing circuit 30, with the correct sign. The composing circuit 31 contains the elements 21 to 28, as well as 17 to 20, of the arrangement shown in FIG. 9, where the bit width of the elements 24, 26, 27 and 28 is increased to the bit width of the partial deviation $|\Delta r_2|$ to be processed. At the output of the composing circuit 31, in the same manner as with the arrangements according to FIGS. 9 and 10, the amount of the total deviation $|\Delta|$ can therefore be obtained, and its sign can be identified.

The principle shown in FIG. 12 can be used for any desired number of address line groups, and instead of the read-write memory chips in the form of RAMs shown in the embodiments, other memory chips which can be written to at specific (reference value) addresses and read out with address control can be used, such as those known under the designations EPROM and EE- PROM, if the slower and somewhat more complicated method of writing to them, as compared to a RAM, is acceptable. This might apply for those cases where a change in the specific (reference value) address occurs only infrequently, or if it does not have to be changed in rapid sequence, as in the case of fixed value controls, for example.

What is claimed is:

1. A method for comparing dual-coded data, comprising the steps of:
   a) coupling a plurality of address lines to a plurality of memories;
   b) distributing the plurality of address lines evenly in groups among the plurality of memories, thereby forming a hierarchy of address line groups;
   c) storing a characteristic data item in each of the plurality of memories at a specific address which maps a reference data item;
   d) coupling a data output of each of the plurality of memories to a read command input of a memory of the plurality of memories assigned to a next higher address line group, except for a data output of a memory of the plurality of memories assigned to a highest address line group, which data output represents a final comparison output;
   e) addressing the plurality of memories with a second data item to be compared with said reference data item; and
   f) reading out a value stored at an address represented by the second data item.

2. A comparator for comparing dual-coded data, comprising:
   a) a plurality of address lines; and
   b) a plurality of memories coupled to said plurality of address lines such that said plurality of address lines are distributed evenly in groups among said plurality of memories, thereby forming a hierarchy of address line groups, each memory having a read command input and a data output, wherein a characteristic data item is stored in each of the plurality of memories at a specific address mapping a reference data item and said data output of each of the plurality of memories is coupled to the read command input of a memory of the plurality of memories assigned to a next higher address line group, except for a data output of a memory assigned to a highest address line group, which data output represents a final comparison output, whereby the plurality of memories is addressable by a second data item to be compared with said reference data item.

3. A comparator for comparing dual-coded data, comprising:
   a) N address lines ($A_0 \ldots A_{N-1}$) including a first group of N/2 address lines and a second group of N/2 address lines, wherein each address line of the N address lines includes M specific addresses ($a_0 \ldots a_{M-1}$);
   b) Z memories, each memory of said Z memories having a bit width equal to M bits, and having M data outputs ($D_0 \ldots D_{M-1}$), each data output ($D_i$) of the M data outputs ($D_0 \ldots D_{M-1}$) being assigned to a corresponding specific address ($a_i$) of said M specific addresses ($a_0 \ldots a_{M-1}$), wherein each memory of the Z memories contains a characteristic data item at a particular address thus mapping a part of a reference data to be compared with a value appearing on the N address lines; and
   c) M AND gates, each AND gate having an output and being assigned to a different corresponding specific address ($a_j$) of the M specific addresses ($a_0 \ldots a_{M-1}$), each AND gate having Z inputs coupled to Z corresponding data outputs ($D_{i1} \ldots D_{iZ}$) that are assigned to said different corresponding specific address ($a_j$) from a total of M×Z data outputs ($D_{00} \ldots D_{M0}, D_{01} \ldots D_{M1}, \ldots, D_{Z1} \ldots D_{ZM}$) available from the Z memories, wherein the output of each AND gate represents a final comparison output of the comparator between the value appearing on the N address lines and the reference value mapped in the Z memories as an output of the comparator.

4. A comparator for comparing dual-coded data, comprising:
   a) a plurality of address lines;
   b) a read only memory having a plurality of inputs and having an output; and
   c) a plurality of memories, each memory having a plurality of address inputs, each memory storing information as to whether a current address available at said plurality of address inputs memory is less than, equal to or greater than a reference value mapped at a specific address in said each memory, each memory having two data outputs, wherein said plurality of address lines are distributed in groups among said plurality of memories, said two data outputs of each memory are coupled with said plurality of inputs of said read-only memory, and said output of the read-only memory represents a final comparison output.

5. A comparator for comparing dual-coded data, comprising:
   a) a plurality of address lines; and
   b) a plurality of memories, each memory having a read command input, having a plurality of addresses, having a plurality of address inputs being coupled to said plurality of address lines, each memory storing at each address a first information as to whether a current address available at said plurality of address inputs of said each memory is less than, equal to or greater than a specific address and storing a dual-coded second information as to the amount by which the current address differs from the specific address, wherein both the first information and the dual-coded second information are readable by activating the read command input of the first memory thus representing a final comparison output.

6. The comparator according to claim 5, wherein the plurality of address lines are distributed in groups, each group being coupled with a different memory of the plurality of memories, thereby forming a hierarchy of address line groups, further comprising:
   a) means for changing said dual-coded second information stored in the plurality of memories into a twos complement representation;
   b) means for changing said dual-coded second information stored in the plurality of memories by the value of −1; and
   c) gating means for outputting said dual-coded second information from the plurality of memories either both changed or both unchanged, dependent upon said first information that is input to said gating means.

7. The comparator according to claim 6, further comprising means for storing at each address of said plurality of memories any changes in said dual-coded second information.

8. A comparator for comparing binary data, comprising:
   a) a plurality of address lines being evenly distributed among a first group of address lines, a second group of address lines, and a third group of address lines;
   b) a first memory having a first plurality of inputs being coupled to the first group of address lines, and having a first data output and a second data output;
   c) a second memory having a second plurality of inputs being coupled to the second group of address lines, and having a first data output and a second data output;
   d) a third memory having a third plurality of inputs being coupled to the third group of address lines, and having a first data output and a second data output;
   e) a first AND gate having a first input being coupled to the first data output of the second memory, having a second input being coupled to the second data output of the second memory, and having an output;
   f) a second AND gate having a first input being coupled to the first data output of the third memory, having a second inverted input being coupled to the second data output of the third memory, and having an output;
   g) a third AND gate having a first input being coupled to the first data output of the third memory, having a second input being coupled to the second data output of the third memory, and having an output;
   h) a fourth AND gate having a first input being coupled to the first data output of the second memory, having a second inverted input being coupled to the second data output of the second memory, having a third input being coupled to the output of the third AND gate, and having an output;
   i) a fifth AND gate having a first input being coupled to the first data output of the first memory, having a second inverted input being coupled to the second data output of the first memory, having a third input being coupled to the output of the first AND gate, having a fourth input being coupled to the output of the third AND gate, and having an output;
   j) a sixth AND gate having a first input being coupled to the first data output of the first memory, having a second input being coupled to the second data output of the first memory, having a third input being coupled to the output of the first AND gate, having a fourth input being coupled to the output of the third AND gate, and having a final comparison output indicative of whether a current address being input to the comparator is equal to a specific address of the comparator, wherein said specific address maps a reference value;
   k) an OR gate having a first input being coupled to the output of the fifth AND gate, having a second input being coupled to the output of the fourth AND gate and having a third input being coupled to the output of the second AND gate, and having a final comparison output indicative of whether the current address is less than the specific address; and
   m) a seventh AND gate having a first inverted input being coupled to the output of the sixth AND gate, having a second inverted input being coupled to the output of the OR gate, and having a final comparison output indicative of whether the current address is greater than the specific address.

9. A comparator for comparing binary data, comprising:
   a) a plurality of address lines being evenly distributed among a first group of address lines, a second group of address lines, and a third group of address lines;
   b) a first memory having a first plurality of inputs being coupled to the first group of address lines, and having a first data output and a second data output;
   c) a second memory having a second plurality of inputs being coupled to the second group of address lines, and having a first data output and a second data output;
   d) a third memory having a third plurality of inputs being coupled to the third group of address lines, and having a first data output and a second data output;
   e) a read only memory having a plurality of inputs being coupled to the first and second data outputs from the first, second and third memories, having a first final comparison output indicative of whether a value being input to the comparator is less than a reference value stored in the comparator, having a second final comparison output indicative of whether the value being input to the comparator is equal to the reference value stored in the comparator, and having a third final comparison output being indicative of whether the value being input to the comparator is greater than the value stored in the comparator.

10. A comparator for comparing a reference value and an actual value, comprising:
   a) a plurality of address lines being distributed evenly among a first address line group and a second address line group;
   b) a first memory having a plurality of inputs being coupled to said first address line group, having a first data output indicative of whether a first actual value address assigned to the first address line group is less than a first reference value address mapping a first reference value in the first memory, having a second data output indicative of whether the first actual value address is equal to the first reference value address, and having a third data output having a bit width corresponding to a number of address lines in the first address line group and indicative of a first partial deviation, wherein said first partial deviation represents a deviation between the actual value address and the reference value address, and the first actual value address represents only part of the actual value, and the first reference value address represents only part of the reference value;
   c) a second memory having a plurality of inputs being coupled to said second address line group, having a first data output indicative of whether a second actual value address assigned to the second address line group is less than a second reference value address mapping a second reference value in the second memory, having a second data output indicative of whether the second actual value address is equal to the second reference value address, having a third data output having a bit width corresponding to a number of address lines in the second address line group and indicative of a second partial deviation, wherein said second partial deviation represents a deviation between the second actual value address and the second reference value address, and the second actual value address represents only part of the actual value, and the second reference value address represents only part of the reference value;

d) a sign former having a first input being coupled to the first data output of the first memory, having a second input being coupled to the second data output of the first memory, having a third input being coupled to the first data output of the second memory, having a fourth input being coupled to the second data output of the second memory, having a first output indicative of whether a sign of a total deviation between the actual value and the reference value is positive, having a second output indicative of whether the sign of the total deviation is negative, and having a third output indicative of whether the actual value and the reference value are equal; and e) a deviation former being coupled to the first and second memories and forming a value indicative of a deviation between the actual value and the reference value, and having a bit width corresponding to the plurality of address lines.

11. The comparator according to claim 10, wherein said sign former further comprises:

a) a first AND gate having a first input being coupled to the first data output of the first memory, having a second input being coupled to the second data output of the second memory, and having an output;

b) a second AND gate having a first input being coupled to the second data output of the first memory, having a second input being coupled to the second data output of the second memory, and having an output indicative of whether the actual value is equal to the reference value;

c) an OR gate having a first input being coupled to the first data output of the second memory, having a second input being coupled to the output of the first AND gate, and having an output indicative of whether the sign of the total deviation between the actual value and the reference value is positive; and d) a third AND gate having a first inverted input being coupled to the output from the OR gate, having a second inverted input being coupled to the output from the second AND gate, and having an output indicative of whether the sign of the total deviation is negative.

12. The comparator according to claim 11, wherein said deviation former further comprises:

a) an exclusive OR gate having a first input being coupled to the first data output of the first memory, having a second input being coupled to the first data input of the second memory, and having an output;

b) an invertor being coupled to the third data output of the first memory, and having an output;

c) an AND gate having a first inverted input being coupled to the second data output of the first memory, having a second input being coupled to the output of the exclusive OR gate, having a third inverted input being coupled to the second data output of the second memory, and having an output;

d) a subtractor having a first input being coupled to the third data output of the second memory, subtracting one from a value at the first input, and providing this as an output;

e) an adder having a first input being coupled to the output of the invertor, adding one to a value at the first input, and providing a twos complement representation of the first partial deviation;

f) a first plurality of data gates being coupled to the output of the AND gate, and switching through the first and second partial deviations to the output of the deviation former, if the first data outputs of the first and second memories are equal or if either of the second data outputs of the first or second memories equals a digital one; and g) a second plurality of data gates being coupled to the output of the AND gate, and switching through the output of said subtractor and said invertor to the output of the deviation former, if the first data outputs of the first and second memories are different and if the second data output from both first and second memories equal a digital logical value zero, whereby the output of the deviation former is indicative of a total deviation of between the actual value and the reference value.

13. The comparator according to claim 10, wherein said deviation former further comprises:

a) an exclusive OR gate having a first input being coupled to the first data output of the first memory, having a second input being coupled to the first data input of the second memory, and having an output;

b) an invertor being coupled to the third data output of the first memory, and having an output;

c) an AND gate having a first inverted input being coupled to the second data output of the first memory, having a second input being coupled to the output of the exclusive OR gate, having a third inverted input being coupled to the second data output of the second memory, and having an output;

d) a subtractor having a first input being coupled to the third data output of the second memory, subtracting one from a value at the first input, and providing this as an output;

e) an adder having a first input being coupled to the output of the invertor, adding one to a value at the first input, and providing a twos complement representation of the first partial deviation;

f) a first plurality of data gates being coupled to the output of the AND gate, and switching through the first and second partial deviations to the output of the deviation former, if the first data outputs of the first and second memories are equal or if either of the second data outputs of the first or second memories equals a digital one; and g) a second plurality of data gates being coupled to the output of the AND gate, and switching through the output of said subtractor and said invertor to the output of the deviation former, if the first data outputs of the first and second memories are different and the second data output from both first and second memories equal a digital logical value zero, whereby the output of the deviation former is indicative of a total deviation of between the actual value and the reference value.

14. The comparator according to claim 10, wherein:
a) said first memory further comprises a fourth data output having a bit width corresponding to a number of address lines in the first address line group and indicative of a value equal to the first partial deviation inverted and then increased by one; and
b) said second memory further comprises a fourth data output having a bit width corresponding to a number of address lines in the second address line group and indicative of a value of the second partial deviation decreased by one.

15. The comparator according to claim 14, wherein said sign former further comprises:
a) a first AND gate having a first input being coupled to the first data output of the first memory, having a second input being coupled to the second data output of the second memory, and having an output;
b) a second AND gate having a first input being coupled to the second data output of the first memory, having a second input being coupled to the second data output of the second memory, and having an output indicative of whether the actual value is equal to the reference value;
c) an OR gate having a first input being coupled to the first data output of the second memory, having a second input being coupled to the output of the first AND gate, and having an output indicative of whether the sign of the total deviation between the actual value and the reference value is positive; and
d) a third AND gate having a first inverted input being coupled to the output from the OR gate, having a second inverted input being coupled to the output from the second AND gate, and having an output indicative of whether the sign of the total deviation is negative.

16. The comparator according to claim 15, wherein said deviation former further comprises:
a) an exclusive OR gate having a first input being coupled to the first data output of the first memory, having a second input being coupled to the first data output of the second memory, and having an output;
b) an AND gate having a first inverted input being coupled to the second data output of the first memory, having a second input being coupled to the output of the exclusive OR gate, having a third inverted input being coupled to the second data output of the second memory, and having an output;
c) a first plurality of data gates being coupled to the output of the AND gate, and switching through the first partial deviation and the second partial deviation to the output of the deviation former, if the first data outputs of the first and second memories are equal or if either of the second data outputs of the first or second memories equals a digital one; and
d) a second plurality of data gates switching through the value of the first partial deviation inverted and then increased by one and the value of the second partial deviation decreased by one to the output of the deviation former, if the first data outputs of the first and second memories are different and if the second data output from both first and second memories equal a digital logical value zero, whereby the output of the deviation former is indicative of a total deviation of between the actual value and the reference value.

17. The comparator according to claim 14, wherein said deviation former further comprises:
a) an exclusive OR gate having a first input being coupled to the first data output of the first memory, having a second input being coupled to the first data output of the second memory, and having an output;
b) an AND gate having a first inverted input being coupled to the second data output of the first memory, having a second input being coupled to the output of the exclusive OR gate, having a third inverted input being coupled to the second data output of the second memory, and having an output;
c) a first plurality of data gates being coupled to the output of the AND gate, and switching through the first partial deviation and the second partial deviation to the output of the deviation former, if the first data outputs of the first and second memories are equal or if either of the second data outputs of the first or second memories equals a digital one; and
d) a second plurality of data gates switching through the value of the first partial deviation inverted and then increased by one and the value of the second partial deviation decreased by one to the output of the deviation former, if the first data outputs of the first and second memories are different and if the second data output from both first and second memories equal a digital logical value zero, whereby the output of the deviation former is indicative of a total deviation of between the actual value and the reference value.

18. A comparator for comparing a reference value and an actual value, comprising:
a) a plurality of address lines being distributed evenly among a first address line group, a second address line group, a third address line group and a fourth address line group;
b) a first memory having a plurality of inputs being coupled to said first address line group, having a first data output indicative of whether a first actual value address assigned to the first address line group is less than a first reference value address, having a second data output indicative of whether the first actual value address is equal to the first reference value address, and having a third data output having a bit width corresponding to a number of address lines in the first address line group and indicative of a first partial deviation, wherein said first partial deviation represents a deviation between the first actual value address and the first reference value address, and the first actual value address represents only part of the actual value, and the first reference value address represents only part of the reference value;
c) a second memory having a plurality of inputs being coupled to said second address line group, having a first data output indicative of whether a second actual value address assigned to the second address line group is less than a second reference value address, having a second data output indicative of whether the second actual value address is equal to the second reference value address, having a third data output having a bit width corresponding to a number of address lines in the second address line group and indicative of a second partial deviation, wherein said second partial deviation represents a deviation between the second actual value address and the second reference value address, and the second actual value address represents only part of the actual value, and the second reference value address represents only part of the reference value;

d) a sign former having a first input being coupled to the first data output of the first memory, having a second input being coupled to the second data output of the first memory, having a third input being coupled to the first data output of the second memory, having a fourth input being coupled to the second data output of the second memory, having a first output indicative of whether a sign of a first subtotal deviation between a first partial actual value address assigned to the first and second address line groups and a first partial reference value address is positive, and having a second output indicative of whether the first partial actual value address and the first partial reference value address are equal, wherein the first partial actual value address represents a part of the actual value represented by both the first and second actual value addresses, and the first partial reference value address represents a part of the reference value represented by both the first and second reference value addresses;

e) a deviation former being coupled to the first and second memories and having as an output a value indicative of the first subtotal deviation and having a bit width corresponding to a total of the first and second address lines;

f) a third memory having a plurality of inputs being coupled to said third address line group, having a first data output indicative of whether a third actual value assigned to the third address line group is less than a third reference value address, having a second data output indicative of whether the third actual value is equal to the third reference value address, and having a third data output having a bit width corresponding to a number of address lines in the third address line group and indicative of a third partial deviation, wherein the third partial deviation represents a deviation between the third actual value address and the third reference value address, and the third actual value address represents only part of the actual value, and the third reference value address represents only part of the reference value;

g) a fourth memory having a plurality of inputs being coupled to said fourth address line group, having a first data output indicative of whether a fourth actual value assigned to the fourth address line group is less than a fourth reference value address, having a second data output indicative of whether the fourth actual value is equal to the fourth reference value address, and having a third data output having a bit width corresponding to a number of address lines in the fourth address line group and indicative of a fourth partial deviation, wherein the fourth partial deviation represents a deviation between the fourth actual value address and the fourth reference value address, and the fourth actual value address represents only part of the actual value, and the fourth reference value address represents only part of the reference value;

h) a first composing circuit having a first input being coupled to the second output of the sign former, having a second input being coupled to the first output of the sign former, having a third input being coupled to the output of the deviation former, having a fourth input being coupled to the second data output of the third memory, having a fifth input being coupled to the first data output of the third memory, having a sixth input being coupled to the third output of the third memory, having a first data output indicative of whether a sign of a second subtotal deviation between a second partial actual value address assigned to the first, second and third address line groups and a second partial reference value address is positive, having a second data output indicative of whether the second partial actual value address and the second partial reference value address are equal, and having a third data output indicative a value of the second subtotal deviation and having a bit width corresponding to a total of the first, second and third address lines, wherein the second partial actual value address represents a part of the actual value represented by all three of the first, second and third actual value addresses, and the second partial reference value address represents a part of the reference value represented by all three of the first, second and third reference value addresses; and i) a second composing circuit having a first input being coupled to the second data output of the first composing circuit, having a second input being coupled to the first data output of the first composing circuit, having a third input being coupled to the third data output of the first composing circuit, having a fourth input being coupled to the second data output of the fourth memory, having a fifth input being coupled to the first data output of the fourth memory, having a sixth input being coupled to the third output of the fourth memory, having a first data output indicative of whether a sign of a total deviation between the actual value and the reference value is positive, having a second data output indicative of whether the sign of the total deviation is negative, having a third output indicative of whether the actual value and the reference value are equal, and having a fourth output indicative a value of the total deviation and having a bit width corresponding to a total of the first, second, third and fourth address lines.

* * * * *